Dec. 2, 1958 M. L. DULL 2,862,567
VEHICLE SHIFTING AND PARKING DEVICE
Filed May 26, 1953 3 Sheets-Sheet 1

Inventor:
Marshall L. Dull
By Connolly and Hutz
Attorneys

Dec. 2, 1958     M. L. DULL     2,862,567
VEHICLE SHIFTING AND PARKING DEVICE
Filed May 26, 1953     3 Sheets-Sheet 2
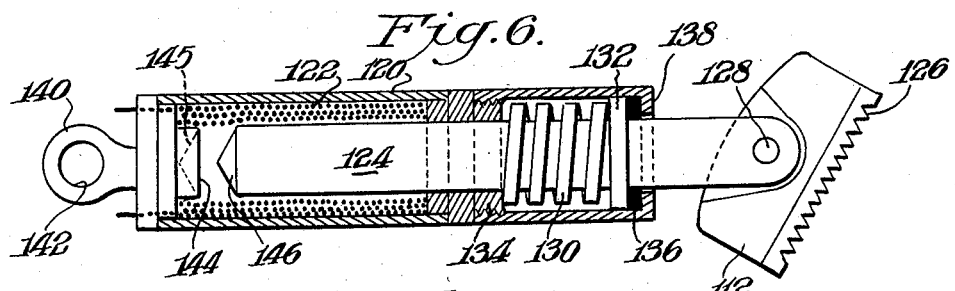
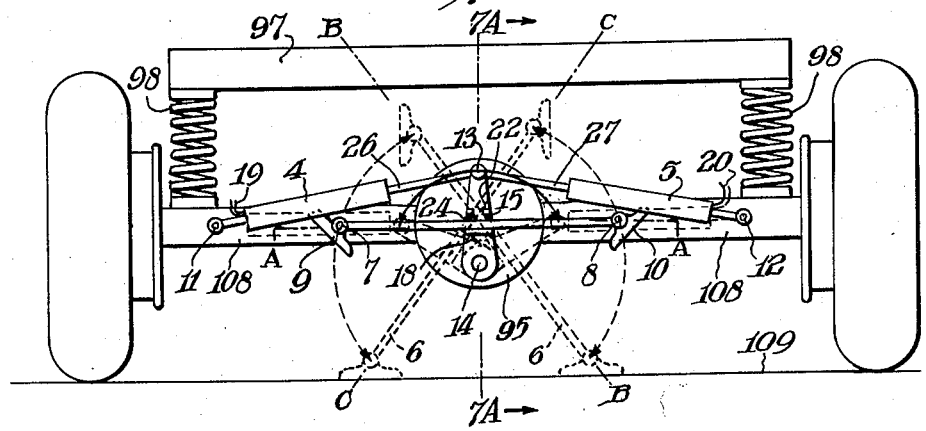
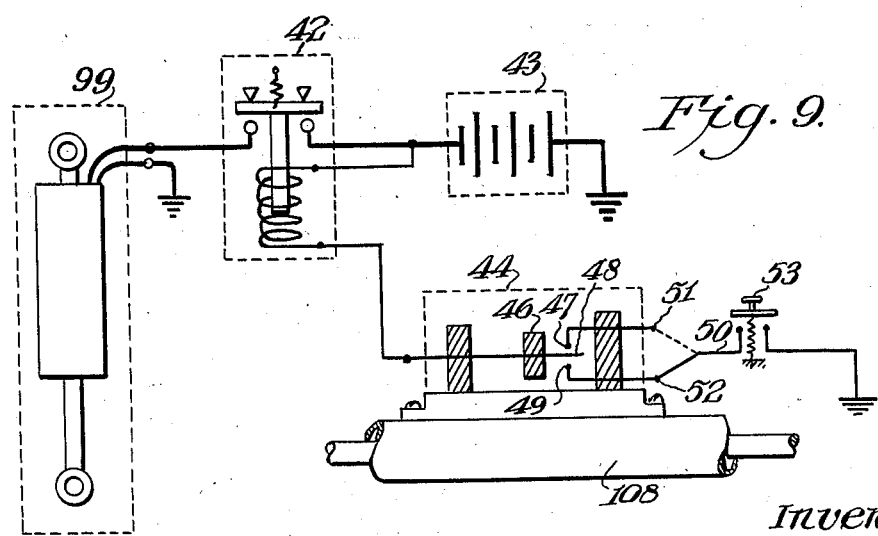
Inventor:
Marshall L. Dull
By Connolly and Hutz
Attorneys.

Dec. 2, 1958 M. L. DULL 2,862,567
VEHICLE SHIFTING AND PARKING DEVICE
Filed May 26, 1953 3 Sheets-Sheet 3
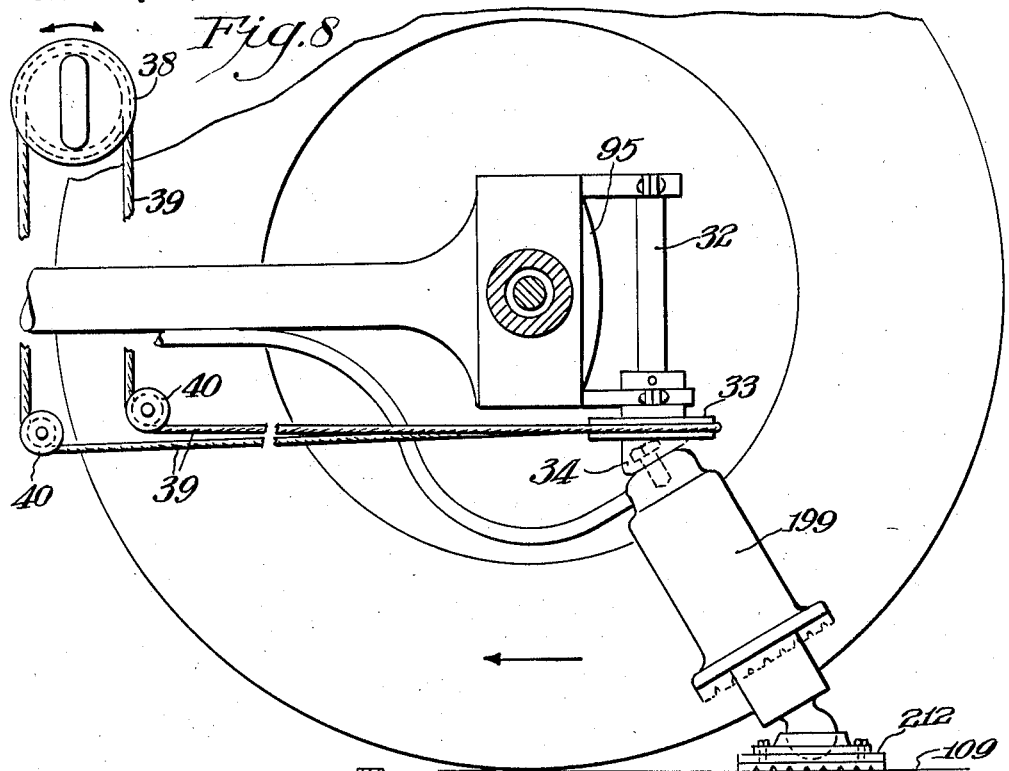
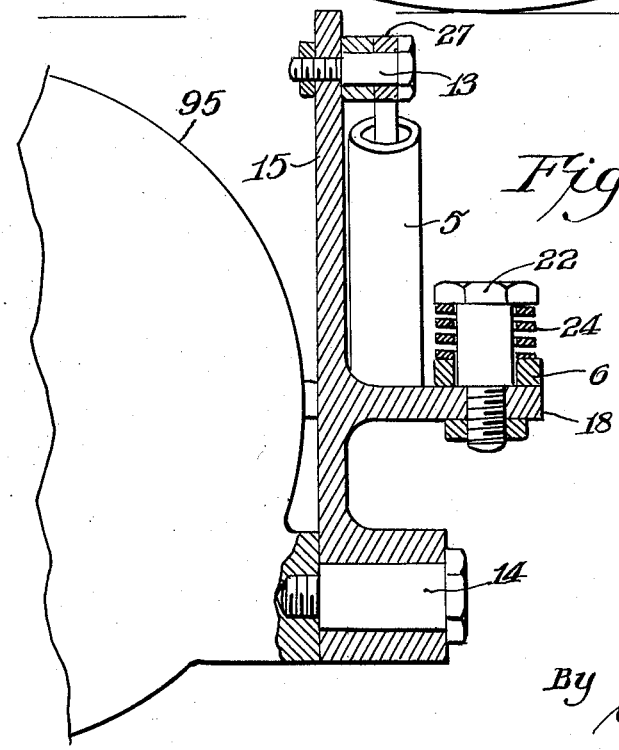
Inventor:
Marshall L. Dull
By Connolly and Hutz
Attorneys

United States Patent Office 2,862,567
Patented Dec. 2, 1958

2,862,567

VEHICLE SHIFTING AND PARKING DEVICE

Marshall L. Dull, Wilmington, Del., assignor to Rotomatic, Incorporated, Wilmington, Del., a corporation of Delaware Application May 26, 1953, Serial No. 357,427

2 Claims. (Cl. 180—1)

The present invention relates to the shifting and parking of wheeled vehicles, particularly by having at least portions of these vehicles move laterally with respect to the directions in which they normally move on the wheels. This application is in part a continuation of parent application Serial No. 1,778 filed January 12, 1948, now Patent No. 2,639,777, granted May 26, 1953.

Among the objects of the present invention is the provision of novel methods and apparatus for effecting lateral movement of the above-mentioned type, specifically through vibratory reactions against a supporting surface.

This as well as additional objects of the present invention will be more completely understood from the following description of several of its exemplifications, reference being made to the accompanying drawings wherein:

Fig. 6 is a cut-away view of a solenoid actuator suitable for use in the constructions of Figs. 1–5 inclusive in accordance with the present invention;

Fig. 7 is a view similar to Fig. 1 of another practical form of lateral shifting apparatus typifying the present invention;

Fig. 7A is a fragmentary sectional view of the construction of Fig. 7, taken along the line 7A—7A;

Fig. 8 is a broken away side view of a portion of an automobile showing a still further construction illustrating the present invention; and Fig. 9 is a detail view of an energizing mechanism suitable for use with the constructions of Figs. 1 to 8 inclusive according to the present invention.

According to the present invention the lateral thrust effects of a vibrating vehicle-shifting mechanism are increased by providing a ground-engaging thrust means interconnected for contacting and applying a lateral thrust against the ground during the vibration.

Figure 1:
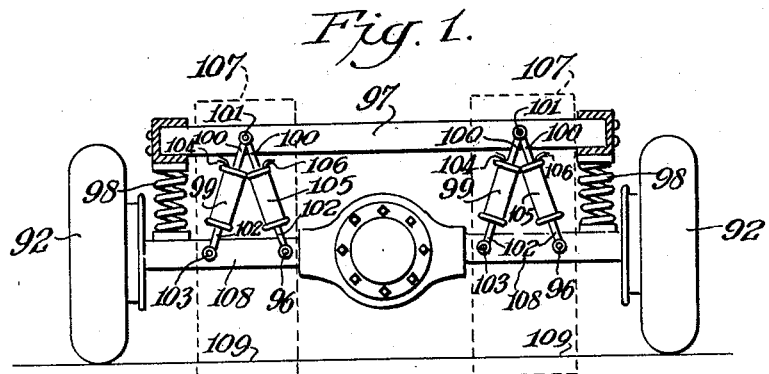
Fig. 1 is a schematic view illustrating the rear axle, wheels and associated parts of an automobile shown in the parent application.

Referring to the figures for a more complete explanation, Fig. 1 shows a lateral shifting arrangement of the above-identified parent application. At 97 is represented the chassis or body of an automobile held by springs 98, 98 on a rear axle housing 108. Each end of this housing carries a wheel 92 which is fitted with a pneumatic or other resilient type of tire that rests on the ground 109.

Two sets of solenoids 99, 105 are connected on each side of chassis 97 between the chassis and the axle housing 108. The dash-line box outlines 107 surround the solenoid mechanisms on the respective sides. In one set of solenoids 99 the individual solenoids are inclined in one lateral direction, the other set 105 being inclined in the opposite direction. As shown, all the solenoids on each side have their upper ends connected by fixed arms 100 to a common pivot point 101 and have lower retracting links 102 connected to separate points 103, 96 on each side of the housing 108. Energizing means for the separate solenoid pairs include electrical leads 104, 106 connected to a suitable control unit not shown.

Figure 2:
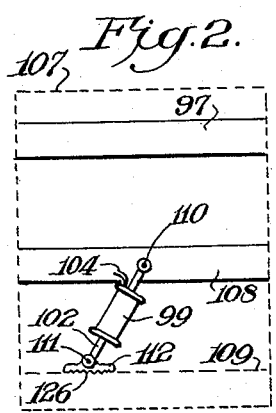
Fig. 2 is a fragmentary view showing a modified portion of the combination of Fig. 1 in accordance with the present invention.

According to the present invention the mechanism on each side of the vehicle in a box 107 can be in the form indicated in Figs. 2, 3, 4 or 5. In Fig. 2 a solenoid 99 is connected to one side of axle housing 108 at a point 110 from which it pivotally depends. The lower end of this solenoid carries a traction foot 112 which can be pivoted at 111 to solenoid link 102. The solenoid when at rest, that is when de-energized, is long enough to reach the ground without hanging vertically with respect to the ground. In other words, the solenoid mechanism is longer than the vertical distance between its point of suspension 110 and the ground.

This mechanism repeated on the other side of the axle housing is sufficient to move the vehicle laterally without having anything connected to the chassis or frame 97. Upon intermittent energization of solenoid 99, as by means of leads 104, the traction foot 112 will be alternately pulled toward and pushed away from pivot point 110. When pushed away, it applies a lateral thrust against axle housing 108 in a direction that urges this axle to the right as seen in Fig. 2. When pulled back, the foot tends to be lifted slightly so that the solenoid rotates to a more vertical position around pivot 110 and the foot loosely slips over the ground 109. At the end of the return stroke, the foot rests against the ground and is ready for the next propulsion stroke.

The thrust required by the vehicle for lateral movement by the solenoid is very large, of the order of many hundreds of pounds, except when the axle is being vibrated up and down to such an extent that the tires on the wheels it carries leave the ground momentarily during the vibration. At that time, only a few pounds of thrust are sufficient. The same few pounds are also sufficient to provide this type of vibration if applied repeatedly at the natural frequency of vibration of the wheel-and-axle assembly. Accordingly, by using a solenoid having a thrust of only about twenty pounds it is possible to move laterally the rear portion of an automobile that weighs two tons or more. Such an automobile would have a rear wheel-and-axle assembly with a natural frequency of vibration of about 4 to 5 times a second. The rear wheel-and-axle assembly of lighter cars generally has a somewhat lower natural frequency, and in the case of heavier cars and trucks a higher frequency, largely because the tires have lower and higher resilience, respectively, as measured by pneumatic tire pressures for example.

Only a few strokes of the solenoid repeated at resonance frequency are sufficient to cause the wheel-and-axle assembly to vibrate with an amplitude sufficient to lift the tires from the ground. The entire assembly then shifts to the right with each succeeding bounce, carrying the chassis or body with it. During this time, the chassis or body shows not the slightest tendency to bounce, apparently because its natural frequency of vibration is so far removed from that of the vibrating assembly.

For best results, the foot 112 should have very little slip with respect to the ground during a propulsion stroke. To this end the foot is advisedly provided with a tough rubber ground-engaging surface 126 preferably ribbed for maximum traction.

Although one such solenoid will be sufficient to effect the above type of lateral motion, two such solenoids can be used, one on each side of the rear axle, both energized in synchronism.

To move the vehicle laterally in both directions, another solenoid combination tilted in the opposite direction is needed, as in the construction of Fig. 1, or a single solenoid combination can be made to selectably shift from one inclination to the opposite inclination. Thus the solenoid 99 in the construction of Fig. 2 can be connected for rotation to an inverted inoperative position when no lateral shifting is to be effected, and to be dropped to the ground in either direction as desired.

Figure 3:
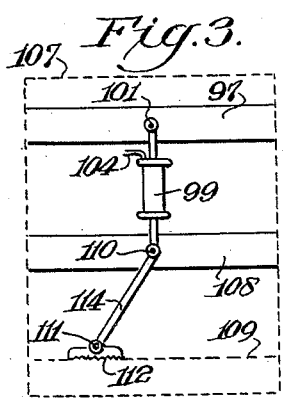

Fig. 3 shows an alternate construction in which a solenoid 99 is connected between the chassis or body 97 and the rear axle 108. An extra thrust leg 114 pivotally depends from axle 108 at the same or a different location, and has a traction foot 112 as in the construction of Fig. 2. In the operation of the construction of Fig. 3 the wheel-and-axle assembly vibrating forces are applied between the assembly and the chassis or body, but the operation is otherwise substantially the same as that of Fig. 2. The body or chassis of the vehicle appears to be the full equivalent of the ground as a base for pushing or pulling the wheel-and-axle assembly, and there is no noticeable difference in the tendency of the chassis or body to vibrate up and down.

In the construction of Fig. 3 the vibration-inducing solenoid can be disposed vertically as well as inclined in either direction. The thrust leg 114 supplies the essential lateral thrust against the ground, and the inclination of the leg determines the direction of the thrust. As in the construction of the solenoid in Fig. 2, this leg should be long enough so that the ground does not permit it to hang vertically. It will in this way thrust against the ground in the same manner. The construction of Fig. 3 needs only one solenoid that can be secured in a fixed position, and only the leg 114 can be made adjustable or provided in oppositely inclined pairs to select the direction of thrust, as in the construction of Fig. 2.

The lateral thrust need not be applied by the vibrating mechanism but can be supplied from any other source. By way of example, the desired wheel-and-axle assembly of an automobile can be vibrated and the automobile then pushed manually by a person outside the automobile.

Figure 4:
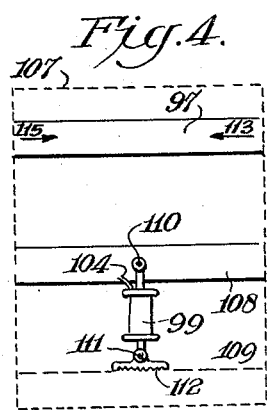
Figs. 3, 4 and 5 are fragmentary views similar to Fig. 2 of further modified forms embodying the present invention.
Figure 5:
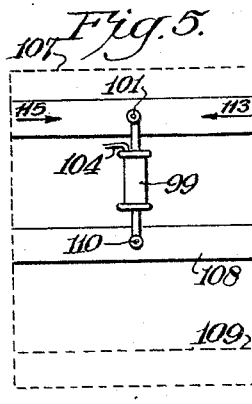

Figs. 4 and 5 show this type of operation. Here vibrating solenoids are arranged to vibrate a vehicle's wheel-and-axle assembly by repeatedly moving it up or down or both up and down with respect to the frame or chassis (Fig. 5) or with respect to the ground (Fig. 4). In any of these arrangements the resulting vibration is substantially the same. Lateral thrust is indicated by the arrows 113, 115.

A feature of the constructions of Figs. 4 and 5 is that when a vehicle is located in a portion of ground that is laterally inclined, the mere vibration of the wheel-and-axle assembly is sufficient to cause the assembly to bounce laterally in the downhill direction under the action of gravity.

Fig. 6 shows a solenoid construction very effective for use with the constructions of Figs. 2 and 4. A tubular housing 120 holds a cylindrical hollow energizing winding 122 within which the solenoid armature or plunger 124 is slidably fitted. The armature projects out through one end of housing 120 and at its end carries a traction foot 112 fitted with a rubber traction surface 126 vulcanized or cemented in place and if desired further secured as by screws not shown. The foot is pivoted to plunger 124 by pin 128. The winding 122 is shorter than housing 120 to provide room for a heavy coil spring 130 fitted around the plunger between a shoulder 132 on the plunger and a ring 134 suitably fixed in the housing. A cushion 136 of felt, for example, can be held between the outer face of shoulder 132 and an internal lip 138 at the foot-carrying end of the housing for example. At the other end housing 120 carries a mounting ear 140 perforated at 142 to pivotally receive a mounting pin.

The housing 120 is arranged to provide the necessary magnetic circuit including a stop 144 for plunger 124. The engaging faces 145, 146 of these two members may be complementary conical as indicated to provide a more uniform magnetic pull if desired.

With the above construction the magnetic pull is only used to compress the spring 130. This retracts the foot 112. Upon de-energization of the solenoid windings the compressed spring expands, pushing the foot back toward its extended position and thereby supplying the desired vibration and thrust. In the event that some obstruction or jamming prevents proper contact with the ground, or interferes with any movement of the axle, the magnetic action will still compress the solenoid spring without causing any damage, even though the spring might not be able to expand.

Figs. 7 and 7A show an arrangement for automatically obtaining properly oriented thrust without requiring any more than a solenoid energizing control. The vehicle is here shown as having a lever 15 pivoted at 14 on the differential housing 95 and carrying a bracket 18 that normally sits in a horizontal plane. To this bracket is fastened an arm 6 carrying ground-engaging shoes 9, 10 pivoted respectively at 7, 8 on each of its ends. For greater flexibility the arm 6 can be yieldably held on the bracket 18 as by means of bolts 22 that loosely fit through the arm and carry springs 24 urging the arm against the bracket.

Solenoids 4, 5 are pivoted at their outer ends on axle housing 108 at locations 11, 12. At their inner ends they are connected by actuating links 26, 27 to the lever 15 at 13. The solenoids 4 and 5 are energized from an electrical source by means of leads 19 and 20; the former associated with solenoid 4 and the latter with solenoid 5.

In operation the actuation of solenoid 5 for example will cause it to contract and rotate arm 6 clockwise from horizontal position A—A to dash-line position B—B whereby the shoe 10 is brought into engagement with the ground 109. Subsequent periodic re-energization of this solenoid will cause the arm to thrust against the ground and push the housing 95 upward and to the left, thereby attaining an axle bouncing lateral movement of the automobile to the left. By a corresponding process, solenoid 4 will produce lateral movement to the right because of the positioning of arm 6 to the dash-line position C—C.

Fig. 8 is an arrangement for orienting an obliquely inclined actuator to impart movement in any desired direction. Journalled behind a differential housing 95 is a vertical shaft 32 with pulley 33 and swivelled rocking mount 34 attached thereto. A reciprocating actuator such as solenoid 199 terminating with shoe 212 is arranged so that it can be extended to engage the ground 109 and can be retracted, for example to the dash-line position, to provide a sufficient clearance from the ground. A manual direction selecting dial and pulley 38 with transmission cable 39 and idler pulleys 40 enable rotation of the reciprocating actuator as desired. The rocking mount 34 should not permit the actuator to hang down vertically.

Fig. 9 is an automatic arrangement for synchronizing the vibratory impulses with the natural bouncing-resonance properties of the axle assembly.

The numeral 99 designates a solenoid designed to either lengthen or shorten with the application of power, whichever is appropriate; 42 is a power relay; 43 is the battery; 44 is an inertia switch attached atop the axle housing 108 to be bounced; 46 is an inertia-weight carried on a vibrating reed contact 48 which at rest engages a fixed contact 49. Lead 50 connects contact 49 by way of terminal 52 through a manually operated push button switch 53 to complete the solenoid energizing circuit during the rising portion of the bounce. Such a construction operates with a solenoid which, when actuated, causes the assembly 108 to move upwardly. If it is desired to use a solenoid system in which actuation of the solenoid 99 causes the assembly to move downwardly, reed 48 is bent up to establish a resting engagement with contact 47 and lead 50 is transferred from terminal 52 to terminal 51.

For best results the reed should not have a natural period of vibration close to the one at which it is to be operated, and the weight 46 should be very close to or even at the contact-engaging portion of the reed.

As many apparently widely different embodiments of this invention may be made without departing from the spirit and scope hereof, it is to be understood that the invention is not limited to the specific embodiments hereof except as defined in the appended claims.

What is claimed is:

1. A shifting device for imparting lateral motion to a vehicle that has a body portion resiliently supported by wheel-and-axle assemblies while these assemblies are resiliently supported on the ground, said device having vibrating means with a vertically directed vibrating thrust of not more than about 20 pounds connected to at least one of said assemblies to cause the connected assembly to vibrate with respect to the ground at its natural vibrating frequency, and said device also including ground-engaging thrust means interconnected with the vibrating means for contacting and applying a lateral thrust against the ground while the assembly is vibrating, to cause the assembly and the body to move laterally.

2. A shifting device for imparting lateral motion to a vehicle that has a body portion resiliently supported by wheel-and-axle assemblies while these assemblies are resiliently supported on the ground, said device having vibrating means connected to at least one of said assemblies to cause the connected assembly to vibrate with respect to the ground at its natural vibrating frequency, and said device also including ground-engaging thrust means interconnected with the vibrating means for contacting and applying a lateral thrust against the ground while the assembly is vibrating, to cause the assembly and the body to move laterally, the vibrating means including at least one solenoid mechanism connected to the wheel-and-axle assembly to be vibrated and having an energizing mechanism that contains inertia switch elements mounted on the wheel-and-axle assembly to be vibrated and connected to make and break an actuating circuit for said solenoid mechanism in synchronism with the vibration.

References Cited in the file of this patent

UNITED STATES PATENTS

| | | |
|---|---|---|
| 1,041,837 | Miks | Oct. 22, 1912 |
| 1,256,651 | Bohmker | Feb. 19, 1918 |
| 1,347,244 | Bernat | July 20, 1920 |
| 1,691,233 | Ehrlich | Nov. 13, 1928 |
| 2,639,777 | Dull | May 26, 1953 |
| 2,662,604 | Henderson | Dec. 15, 1953 |